United States Patent
Artuso et al.

(10) Patent No.: US 10,317,255 B2
(45) Date of Patent: Jun. 11, 2019

(54) DISTRIBUTED FIBER SENSORS AND SYSTEMS EMPLOYING HYBRIDCORE OPTICAL FIBERS

(71) Applicant: Corning Incorporated, Corning, NY (US)

(72) Inventors: Anthony Artuso, Corning, NY (US); Valery A Kozlov, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/873,459

(22) Filed: Jan. 17, 2018

(65) Prior Publication Data
US 2018/0202843 A1    Jul. 19, 2018

Related U.S. Application Data

(60) Provisional application No. 62/448,053, filed on Jan. 19, 2017.

(51) Int. Cl.
| | |
|---|---|
| *G01L 1/24* | (2006.01) |
| *G01D 5/353* | (2006.01) |
| *G01K 11/32* | (2006.01) |
| *G01M 11/00* | (2006.01) |
| *G02B 6/028* | (2006.01) |

(Continued)

(52) U.S. Cl.
CPC ....... *G01D 5/3538* (2013.01); *G01D 5/35361* (2013.01); *G01D 5/35364* (2013.01); *G01K 11/32* (2013.01); *G01M 11/3109* (2013.01); *G02B 6/02042* (2013.01); *G02B 6/03633* (2013.01); *G02B 6/03644* (2013.01); *G01L 1/242* (2013.01); *G02B 6/0281* (2013.01); *G02B 6/0285* (2013.01); *G02B 6/0286* (2013.01)

(58) Field of Classification Search
CPC ............ G02B 6/02042; G01D 5/3538; G01D 5/35364; G01M 11/3109
See application file for complete search history.

(56) References Cited

U.S. PATENT DOCUMENTS

| | | | |
|---|---|---|---|
| 4,726,827 A * | 2/1988 | Powers | C03B 37/014 65/144 |
| 5,191,206 A | 3/1993 | Boiarski et al. | |
| 5,627,934 A | 5/1997 | Muhs | |

(Continued)

OTHER PUBLICATIONS

Artuso et al; "Rayleigh Scattering Based Distributed Fiber Sensors"; U.S. Appl. No. 62/547,997, filed Aug. 21, 2017; 24 Pages.

(Continued)

*Primary Examiner* — Thomas A Hollweg
*Assistant Examiner* — Mary A El-Shammaa
(74) *Attorney, Agent, or Firm* — Smit N. Kapadia; Svetlana Z. Short

(57) ABSTRACT

According to some embodiments a fiber sensor comprises: —an optical fiber configured for operation at a wavelength from about 300 nm to about 2000 nm, and further defined by a transmission end, another end, a fiber outer diameter and a fiber length, the fiber comprising: (a) a hybrid core comprising a single mode core portion and a multi-mode core portion; and (b) a cladding surrounding the hybrid core.

21 Claims, 8 Drawing Sheets

(51) Int. Cl.
G02B 6/036 (2006.01)
G02B 6/02 (2006.01)

(56) References Cited

U.S. PATENT DOCUMENTS

| | | |
|---|---|---|
| 6,681,072 B2 | 1/2004 | Nagayama et al. |
| 7,139,458 B2 | 11/2006 | Koh et al. |
| 7,203,407 B2 | 4/2007 | Berkey et al. |
| 9,321,222 B2 | 4/2016 | Childers et al. |
| 9,563,012 B2 * | 2/2017 | Molin ............. G02B 6/0288 |
| 2003/0137722 A1 * | 7/2003 | Nikolajsen ......... C03C 13/045 359/341.1 |
| 2004/0131322 A1 * | 7/2004 | Ye ..................... G01N 21/645 385/126 |
| 2005/0271317 A1 | 12/2005 | Taverner |
| 2012/0127459 A1 | 5/2012 | Manderek |
| 2013/0279867 A1 | 10/2013 | Oyamada et al. |
| 2013/0287353 A1 * | 10/2013 | Molin ............. G02B 6/0288 385/126 |
| 2014/0263985 A1 | 9/2014 | Westbrook |
| 2016/0209598 A1 | 7/2016 | Jaaskelainen et al. |
| 2017/0146371 A1 | 5/2017 | Kozlov et al. |

OTHER PUBLICATIONS

International Search Report and Written Opinion PCT/US2018/013984 dated May 2, 2018.

* cited by examiner

DISTRIBUTED FIBER SENSORS AND SYSTEMS EMPLOYING HYBRIDCORE OPTICAL FIBERS

This application claims the benefit of priority to U.S. Provisional Application Ser. No. 62/448,053, filed on Jan. 19, 2017, the content of which is relied upon and incorporated herein by reference in its entirety.

FIELD

The disclosure generally relates to distributed fiber sensors and fiber sensor systems. More particularly, the disclosure relates to such sensors and sensor systems that employ Hybridulticore fibers which rely on Rayleigh scattering mechanisms for sensing.

BACKGROUND

Distributed fiber sensors and systems that rely on Rayleigh scattering are being adopted for many applications, including but not limited to, structure health monitoring (SHM), geotechnical engineering, power lines, oil and gas pipe lines, and oil and gas welds. In particular, these sensors and systems can employ Rayleigh scattering mechanisms to measure temperature, pressure, strain, acoustic waves and other parameters with a spatial resolution of less than 1 m.

Conventional approaches that rely on Rayleigh scattering often employ telecommunication grade optical fibers in distributed fiber sensors and systems to obtain these measurements (e.g., temperature, pressure, strain, etc.). Distributed fiber sensors and systems that rely on such optical fibers suffer from various drawbacks. For example, the optical power of the launched signal can be limited by low threshold, nonlinear effects in the fiber. As a result, the scattered signal is often low, especially at the far end of the fiber away from the transmission end. As another example, attenuation in these optical fibers can also limit the scattered signal strength at the far end of the fiber, especially for fiber spans of tens of kilometers. Further, the optical power in telecommunication grade fibers that are configured for single mode operation is often low due to the small numerical aperture of such fibers. All of these effects tend to reduce the signal-to-noise ratio associated with conventional distributed fiber sensors and systems that employ telecommunication grade optical fibers.

As distributed fiber sensors and systems that rely on optical fibers and Rayleigh scattering mechanisms continue to be employed in various applications (e.g., geotechnical engineering, power lines, etc.), the use of these sensors and systems is ultimately limited by their effectiveness at longer and longer distances.

There is therefore a need for distributed fiber sensors and fiber sensor systems that employ optical fibers that can transmit optical signals with less loss and higher signal-to-noise ratios.

SUMMARY

According to an aspect of the disclosure, a fiber sensor comprises: —an optical fiber configured for operation at a wavelength from about 300 nm to about 2000 nm, and further defined by a transmission end, another end, a fiber outer diameter and a fiber length, the fiber comprising:
  a hybrid core comprising a single mode core portion and
    a multi-mode core portion; and
  a cladding surrounding the hybrid core.

According to a further aspect of the disclosure, the single mode core portion comprises $GeO_2$, and the maximum amount of $GeO_2$ in the single mode core portion is 6 wt % to 50 wt %.

In some embodiments the multi-mode core portion comprises 0 to 45 wt % $GeO_2$, for example 5 to 45 wt % $GeO_2$, or 5.5 to 45 wt % $GeO_2$. In some embodiments, the maximum amount of $GeO_2$ in multi-mode core portion is 5.5 wt % to 35 wt % In some embodiments, the maximum amount of $GeO_2$ in multi-mode core portion is 5-20 wt %. In some embodiments the multi-mode core portion comprises 0 to 45 wt % $GeO_2$ and 0.5 to 3 wt % Cl.

In other implementations of these fiber sensor aspects, the multicore fiber is configured such that its length ranges from about 10 m to about 100 km. Further, the fiber length can be set at about 10 m, 20 m, 30 m, 40 m, 50 m, 60 m, 70 m, 80 m, 90 m, 100 m, 150 m, 200 m, 250 m, 300 m, 350 m, 400 m, 450 m, 500 m, 550 m, 600 m, 650 m, 700 m, 750 m, 800 m, 850 m, 900 m, 950 m, 1 km, 5 km, 10 km, 15 km, 20 km, 25 km, 30 km, 35 km, 40 km, 45 km, 50 km, 55 km, 60 km, 65 km, 70 km, 75 km, 80 km, 85 km, 90 km, 95 km, 100 km, and all length values between these specified lengths in certain implementations.

In further implementations the single mode core portion has a maximum relative refractive index $\Delta_{31}$ and the multi-mode difference core portion has a maximum relative refractive index $\Delta_{32}$ and $0.2\% \leq \Delta_{31} - \Delta_{32} \leq 1\%$.

The sensor according to claim 1, wherein the core portions of the transmission end of the fiber are arranged and configured within the fiber to receive incident light from a single light source having a spot size from about 5 micron to about 100 microns (in diameter).

In addition, some implementations of the fiber sensor comprises:
  an optical fiber configured for operation at a wavelength from about 300 nm to about 2000 nm, and further defined by a transmission end, another end, a fiber outer diameter and a fiber length, the fiber comprising:
    a hybrid core comprising a single mode core portion and
      a multi-mode core portion; and
    a cladding surrounding the hybrid core, and
    further wherein the transmission end of the fiber exhibits a total backscattered signal that emanates from both the single mode core portion and the multimode core portion after light from a source has been injected into the core at the transmission end of the fiber.

In some embodiments total backscattered signal that emanates from the hybrid core has a signal-to-noise ratio that is greater than a signal-to-noise ratio from a backscattered signal obtained from a reference, single mode core optical fiber, and in some embodiments the total backscattered signal that emanates from the hybrid core has a signal-to-noise ratio that is at least 25% (e.g., at least 30%, at least 40%, or at least 50%) greater than a signal-to-noise ratio from a backscattered signal that emanates from a reference, single mode core optical fiber. In some embodiments total backscattered signal that emanates from the hybrid core has a signal-to-noise ratio that is at least 25% (e.g., at least 30%, at least 40%, or at least 50%) greater than a signal-to-noise ratio from a backscattered signal from SMF-28® fiber.

In some embodiments of the hybrid core fiber the total backscattered signal that emanates from the hybrid core is greater than backscattered signal from a reference, single mode core optical fiber by at least 1 dB (e.g., by at least 1.5 dB greater). In some embodiments the total backscattered signal that that emanates from the hybrid core is greater than backscattered signal from the SMF-28® fiber by at least 1 dB (e.g., by at least 1.5 dB greater).

In some embodiments, total backscattered signal that emanates from the hybrid core has a signal-to-noise ratio that is at 100%, at least 200%, at least 250%, at least 300%, at least 350%, or 400% greater than a signal-to-noise ratio from a backscattered signal from a reference, single-mode core optical fiber. In some embodiments total backscattered signal that emanates from the hybrid core has a signal-to-noise ratio that is at 100%, at least 200%, at least 250%, at least 300%, at least 350%, or 400% greater than a signal-to-noise ratio from a backscattered signal from the SMF-28® fiber.

According to another exemplary implementation of these fiber sensor systems, a fiber sensor system comprises:

an optical fiber configured for one of single or few mode operation at a wavelength from about 300 nm to about 2000 nm, and further defined by a transmission end, another end, a fiber outer diameter and a fiber length, the fiber comprising:
  a hybrid core comprising a multi-mode core portion and a single mode core portion, and
  a cladding surrounding the hybrid core,
  a light source configured to direct a spot of incident light into at least one portion of the core at the transmission end of the fiber;
  a receiver configured to receive a total backscattered signal that emanates from the hybrid core after the spot of incident light has been injected into the hybrid core at the transmission end of the fiber; and
  a signal interrogation element configured to process the backscattered signal to obtain a sensor measurement that corresponds to a feature in proximity to or in contact with the fiber.

According to some embodiments the sensor measurement comprises one or more characteristic from the group consisting of temperature, pressure, strain, displacement, and noise.

According to other embodiments of the fiber sensor system, any of the foregoing hybrid core fibers and fiber sensor configurations outlined in the disclosure can be employed in the system. In certain aspects of the fiber sensor system, the sensor measurement can include one or more characteristic from the group consisting of temperature, pressure, strain, displacement, and noise.

In certain implementations of the fiber sensor system, the system is configured for use in monitoring the health, integrity, performance and/or characteristics of a structure, a power line, an oil line or pipe, a gas line or pipe, a water-carrying line or pipe, foundation, road, channel, waterway, reservoir, well, or other geotechnical feature.

According to some embodiments, an optical fiber comprises:
  (i) a hybrid core comprising a single mode core portion and a multi-mode core portion; and
  (ii) a cladding surrounding the hybrid core, wherein the maximum amount of $GeO_2$ in multi-mode core portion is 5.5 wt % to 35 wt %.

According to some embodiments the maximum amount of $GeO_2$ in the single mode core portion is 6 wt % to 50 wt %. According to some embodiments the single mode core portion has a maximum relative refractive index $\Delta_{31}$ and the multi-mode difference core portion has a maximum relative refractive index $\Delta_{32}$ and $0.2\% \leq \Delta_{31} - \Delta_{32} \leq 1\%$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
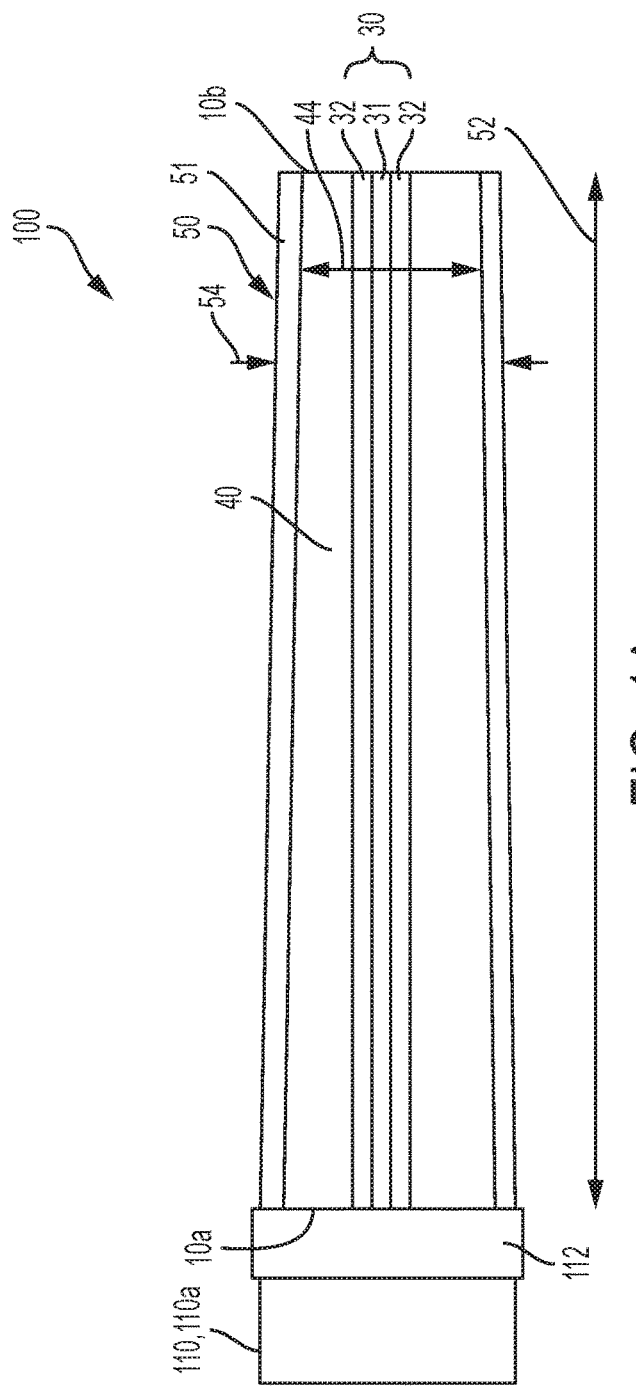
FIG. 1A is an axial cross-section schematic of a fiber sensor employing a hybrid core optical fiber according to an aspect of the disclosure.

The following terminology will be used in conjunction with the optical fibers described herein:

The term "refractive index profile" or "relative refractive index profile," as used herein, is the relationship between the refractive index or the relative refractive index and the radius R of the fiber.

The term "relative refractive index," as used herein, is defined as:

$$\Delta(r)\% = 100 \times \frac{(n(r)^2 - n_{REF}^2)}{2n(r)^2},$$

where n(r) is the refractive index at radius r of the optical fiber, unless otherwise specified, and r=0 corresponds to the centerline of the fiber. The relative refractive index is defined at 1550 nm unless otherwise specified. In the embodiments described herein, the reference index $n_{REF}$ is the refractive index of pure (i.e., un-doped) silica glass. As used herein, the relative refractive index is represented by Δ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "up-dopant," as used herein, refers to a dopant which raises the refractive index of glass relative to pure, un-doped $SiO_2$. The term "down-dopant," as used herein, is a dopant which has a propensity to lower the refractive index of glass relative to pure, un-doped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The numerical aperture (NA) of an optical fiber, as used herein, means the numerical aperture as measured using the method set forth in IEC-60793-1-43 (TIA SP3-2839-URV2 FOTP-177) titled "Measurement Methods and Test Procedures: Numerical Aperture".

The terms "microns" and "μm" are used interchangeably herein. The terms "nanometers" and "nm" are used interchangeably herein Reference will now be made in detail to the present preferred embodiments, examples of which are illustrated in the accompanying drawings. Whenever possible, the same reference numerals will be used throughout the drawings to refer to the same or like parts.

Distributed fiber sensors and fiber sensor systems which rely on Rayleigh scattering mechanisms for sensing that are characterized by low signal loss and higher signal-to-noise ratios are outlined in exemplary fashion in this disclosure. More particularly, the disclosure details distributed sensors and sensor systems that employ hybrid core fibers.

Figure 1B:
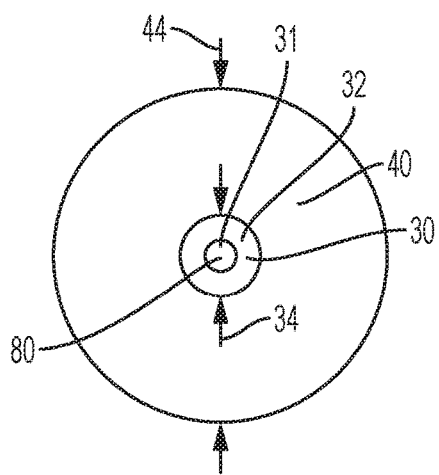
FIG. 1B is a transverse cross-section schematic of the fiber sensor portion of the fiber depicted in FIG. 1A.
Figure 1C:
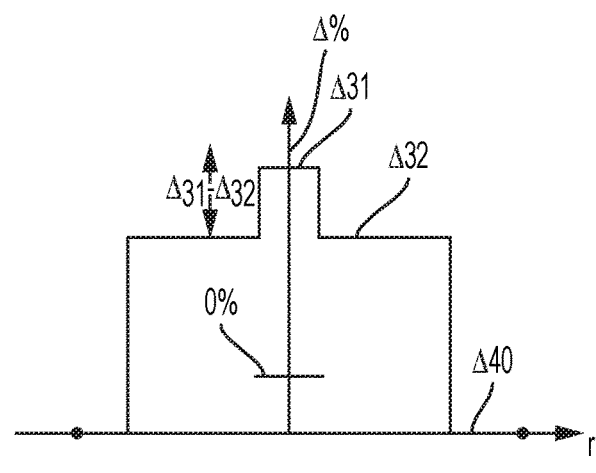
FIG. 1C-1G are a schematic illustration of a relative refractive index profiles of some embodiments of the fiber 50 depicted in FIGS. 1A and 1B.

Referring to FIGS. 1A, 1B and 1C, a fiber sensor 100 is depicted schematically according to an aspect of the disclosure. The fiber sensor 100 includes a light source 110, optical fiber 50 coupled thereto, and a receiver 110a optically coupled to the optical fiber 50 for receiving/detecting the backscattered light provided by the optical fiber 50. The backscattered light is diverted from impinging back on the light source and is directed to a receiver 110a by an optical component 112, for example a beam splitter, a fiber coupler, or a circulator. The optical fiber 50 is defined by a length 52, fiber outer diameter 54, a transmission end 10a (first end of the fiber), another end (the second end) 10b, and a hybrid core 30. As depicted in exemplary fashion in FIGS. 1, 1A and 1B, the fiber core 30 contains a single mode core portion 31 (inner core portion) and a multi-mode core portion 32 (outer core portion). The optical fiber 50 also includes a cladding 40 that surrounds the hybrid core 30 and has an outer cladding diameter 44. The optical fiber includes a protective coating 51 comprising one or more coating layers situated around the cladding 40. The coated fiber has an outer diameter 54.

In some embodiments of the fiber sensor 100, the optical fiber 50 is defined by a length 52 that ranges from about 10 m to about 100 km. In certain embodiments, the fiber length 52 can be set at about 10 m, 20 m, 30 m, 40 m, 50 m, 60 m, 70 m, 80 m, 90 m, 100 m, 150 m, 200 m, 250 m, 300 m, 350 m, 400 m, 450 m, 500 m, 550 m, 600 m, 650 m, 700 m, 750 m, 800 m, 850 m, 900 m, 950 m, 1 km, 5 km, 10 km, 15 km, 20 km, 25 km, 30 km, 35 km, 40 km, 45 km, 50 km, 55 km, 60 km, 65 km, 70 km, 75 km, 80 km, 85 km, 90 km, 95 km, 100 km, and all length values between these specified lengths. Further, other aspects of the disclosure include optical fibers 50 with fiber lengths 52 exceeding 100 km that are viable for some applications of the fiber sensor 100 having less stringent signal-to-noise ratio and/or spatial resolution requirements (e.g., >1 m).

The optical fiber 50 employed in the fiber sensor 100 of the disclosure may, in some aspects, have a cladding diameter 44 from about 50 microns to about 500 microns. Further, the fiber 50 employed in these aspects can be configured with the cladding diameter 44 of about 50 microns, 75 microns, 100 microns, 125 microns, 150 microns, 200 microns, 300 microns, 400 microns, 500 microns and all diameters between these specified diameters.

The coated optical fiber 50 employed in the fiber sensor 100 of the disclosure may, in some aspects, have an outer fiber diameter 54 from about 100 microns to about 1000 microns. Further, the fiber 50 employed in these aspects can be configured with an outer fiber diameter 54 of about 100 microns, 150 microns, 200 microns, 250 microns, 300 microns, 400 microns, 500 microns, 750 microns, 1000 and all diameters between these specified diameters.

Referring again to FIGS. 1, 1A and 1B, the optical fiber 50 and, more particularly, the core 30 and the cladding 40 are typically fabricated with a silica composition. Further, the optical fiber 50 and, more particularly, the single mode portion 31 and the multi-mode portion 32 of the core 30 as well as the cladding 40 are preferably configured with various dopant levels to achieve an overall refractive index profile in the fiber sufficient for single mode and multi mode operation at a wavelength from about 300 nm to about 2000 nm. In certain aspects, the core 30 is silica doped with one or more dopants to raise (relative to that of pure silica) the refractive index of the core 30, e.g., $GeO_2$, $P_2O_5$, $Al_2O_3$. The cladding 40, in certain implementations, is doped with one or more dopants to reduce the refractive index of the cladding, e.g., F, $B_2O_3$.

As shown, for example, in the embodiments depicted in FIGS. 1A, 1B and 1C, the optical fiber 50 is configured such that its core portions 31, 32 are arranged symmetrically about a central axis 80 of the fiber according to an implementation of the fiber sensor 100 in the disclosure. In this embodiment, for example, the core portion 31 is centered about the optical axis and is single moded for wavelength λ1 of 300 nm to 2000 nm, for example in the range of 1200 nm to 1600 nm. Preferably the outer radius of the core portion 31 is 3-6 μm. The core portion 32 has an annular shape, surrounds the core portion 31, and in some embodiments (see FIGS. 1C-1F) is situated directly adjacent to the core portion 31. According to some embodiments, the inner and outer radii of the core portion 32 are 3 to 10 μm (e.g., 2-6 μm) and 10-100 μm, respectively.

In some embodiments the core portion 32 is multi moded for the same wavelength λ1 (e.g., for 300 nm to 2000 nm). In some embodiments the core portion 32 is multi moded for the wavelengths of 600 nm to 1600 nm, or 1200 nm-1600 nm. The 1200 nm-1600 nm wavelengths are situated in a low loss (low attenuation) window for silica based core fibers, and operating the fiber sensor 100 at a wavelength that is situated within the 1200 nm-1600 nm range provides the maximum amount of collected backscattered light to the receiver 110a, and thus maximizes signal to noise ratio and system detection sensitivity. Therefore, the receiver 110a is preferably structured to receive the back scattered light in the within the 1200 nm-1600 nm wavelength range.

In some embodiments, the inner core portion 31 and the outer core portion 32 (see, for example, FIG. 1G) are separated by a low index layer 33 (i.e., by a layer 33 that has a maximum index of refraction that is lower than that of core portions 31, 32). This separation by the low index layer 33 minimizes the amount light propagating through the fiber core portion 31 (from the transmission end 10a of the fiber toward the end 10b) from coupling into the multimode core portion 32. In some embodiments outer radius of the core portion 32 is 10-50 μm and the outer radius of the cladding 40 is 50-75 μm (outer diameter 44 is about 100-150 μm, e.g., 125 μm). In some embodiments the outer radius of the core portion 32 is 10-50 μm (e.g., 20 μm, 22 μm, 25 μm, 30 μm, 35 μm, 40 μm, 45 μm 50 μm, or any value there between).

Figure 1G:
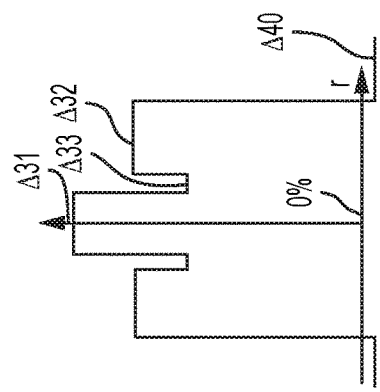

In one exemplary embodiment corresponding to FIG. 1G the fiber has: (i) an inner core portion (single mode core portion 31) that is silica doped with a maximum of about 25 wt % $GeO_2$ and has an outer radius of about 4 μm; and (ii) an outer most core portion (multi mode core portion 32) that is doped with a maximum about 18 wt %. $GeO_2$ and has an inner radius of about 20 μm and an outer radius of about 50 μm. In this embodiment, the low index core layer 33 of the fiber core 30 (i.e., the core layer with lower index of refraction than that of core portions 31, 32) has a maximum relative refractive index Δ33 (relative to that of pure (undoped) silica glass) and is doped with 15 wt % $GeO_2$ and is sandwiched between core portions 31 and 32. As we can see, the entire core 30 of this exemplary fiber is updoped relative to pure silica, in this case each portion of the core has an area with at least 15 wt % $GeO_2$. In this exemplary embodiment the cladding 40 is pure silica and contains no fluorine and no boron. In some embodiments the cladding 40 is downdoped with fluorine and/or boron.

In some embodiments layer 33 may be silica doped with less than 15 wt % $GeO_2$ (e.g., 3 wt %, or greater). In some exemplary embodiments layer 33 silica doped with 5 wt % $GeO_2$, 10 wt % $GeO_2$, 15 wt % $GeO_2$, or any amount therebetween). In some embodiments layer 33 has more than 15 wt % $GeO_2$, as long as its maximum relative refractive index $\Delta_{33}$ is less than maximum relative refractive index $\Delta_{32}$ of core portion 32.

As also depicted in FIG. 1C, the optical fiber 50 is configured such that the single mode core portion 31 at wavelengths 600 to 1600 nm (e.g., 1200 to 1600 nm) has a substantially higher refractive index than that of the multimode core portion 32. In some embodiments the maximum relative refractive index $\Delta_{31}$ of the core portion 31 (relative to that of pure (undoped) silica glass) is from about 0.4% to 3%. Further, core portion 31 can be configured with a relative refractive index $\Delta_{31}$ of about 0.4%, 0.5%, 0.6%, 0.7%, 0.8%, 0.9%, 1%, 1.2%, 1.5%, 1.8%, 2%, 2.2%, 2.5%, or 3%, and all the ranges between these specified values. (In contrast, for example, in SMF-28® the core has a maximum relative refractive index of 0.34 (relative to pure silica).

In some embodiments the maximum relative refractive index $\Delta_{32}$ of the multi-mode core portion 32 at wavelengths 600 to 1600 nm (relative to that of pure (undoped) silica glass) may be from about 0 to about 2.7%, relative to pure silica, and in some embodiments 0.1% to 2.7%. Further, core portion 32 can be configured with a $\Delta_{32}$ of about 0.1%, 0.2%, 0.3%, 0.4%, 0.5%, 0.6%, 0.7%, 0.9%, 1%, 1.5%, 2%, 2.3%, 2.5%, or 2.7% and all the ranges between these specified values. In the embodiments described herein $\Delta_{31}$>$\Delta_{32}$.

In some embodiments the difference between $\Delta_{31}$ and $\Delta_{32}$ is from about 0.3% to about 0.6%. In some embodiments 0.33%≤$\Delta_{31}$-$\Delta_{32}$≤0.5%. For example, $\Delta_{31}$-$\Delta_{32}$ may be, 0.3%, 0.31%, 0.33%, 0.37%, 0.4%, 0.43%, 0.46, 0.5%, 0.55%, 0.6%, and all the ranges between these specified values.

The cladding has a maximum relative refractive index $\Delta_{40}$, relative to pure silica. In some exemplary embodiments 0%≤$\Delta_{40}$≤−1%. In some exemplary embodiments 0.1%≤$\Delta_{40}$≤−0.7%. In some exemplary embodiments 4%≥$\Delta_{31}$-$\Delta_{40}$≥0.4%. In some exemplary embodiments 3%≥$\Delta_{31}$-$\Delta_{40}$≥0.4%. In some exemplary embodiments 1.5%≥$\Delta_{31}$-$\Delta_{40}$≥0.3%. In some exemplary embodiments 1.5%≥$\Delta_{31}$-$\Delta_{40}$≥0.4%. For example $\Delta_{31}$-$\Delta_{40}$ may be 0.3%, 0.4%, 0.5%, 0.6%, 0.7%, 0.8%, 0.9%, 1%, 1.5%, 2%, 2.5%, 3%, 3.5%, 4%, and any values therebetween. In some exemplary embodiments 2.7%≥$\Delta_{31}$-$\Delta_{40}$≥0%. In some exemplary embodiments 1.5%≥$\Delta_{32}$-$\Delta_{40}$≥0.1% (e.g., 0.1%, 0.15%, 0.2%, 0.25%, 0.3%, 0.4%, 0.5%, 0.6%, 0.7%, 0.8%, 0.9%, 1%, 1.25%, 1.5%, and any values therebetween.

In some embodiments containing the core layer 33, $\Delta_{31}$>$\Delta_{32}$, and $\Delta_{32}$>$\Delta_{33}$ and the difference between $\Delta_{32}$ and $\Delta_{33}$ is from about 0.1% to 1%.

In some aspects of the disclosure, the core 30 of the fiber 50 is configured with an outer core diameter 34 from about 20 micron to about 100 microns. In other aspects, the core 30 of the fiber 50 are preferably configured with an outer core diameter 34 from about 30 microns to about 100 microns, or 40 to 100 microns.

Figure 2:
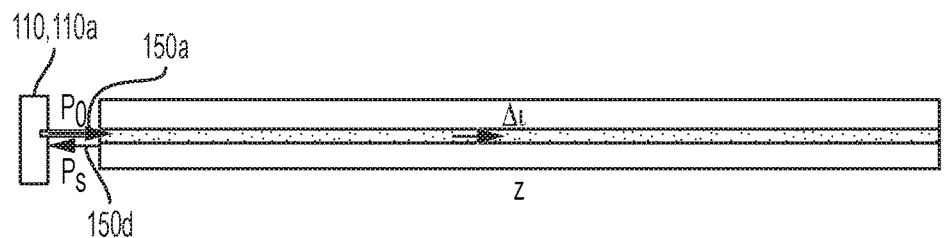
FIG. 2 is an axial cross-section schematic of another fiber sensor.

In an Rayleigh scattering based distributed sensing system (see, for example, FIG. 2), the power $P_s$ of back scattered light signal 150d detected by the receiver that is due to Rayleigh scattering originating at location z within an optical fiber is:

$$P_s = C\alpha_s \Delta l P_0 e^{-2(\alpha_s+\alpha_0)z} \quad (1)$$

where $P_0$ is the power of incident light 150a provided to the fiber at a location z=0, C is the capture coefficient for the scattered light, $\alpha_s$ is the Rayleigh scattering coefficient (loss coefficient due to Rayleigh scattering), and $\alpha_0$ is the loss coefficient for losses due to other factors.

The capture efficiency of back scattered light in an optical fiber is related (and is proportional) to the fiber's capture coefficient C, which defined as:

$$C = \kappa \frac{NA^2}{n_1^2} \quad (2)$$

where NA is the numerical aperture of the core, $n_1$ is the refractive index of the core, κ is a parameter that depends on type of the fiber core. For typical single mode fibers with only single mode cores having a step index core profile, κ is about 0.38, and for a typical graded index profile single mode fibers, κ is about 0.25. For hybrid core fiber 50 utilized in the fiber sensor 100 shown in FIG. 2, κ is also in the arrange of 0.25 to 0.38, (depending on the shape of the core profile's), but the numerical aperture NA of the fiber 50 is greater than that of a typical single mode transmission fiber.

For typical modern single mode transmission fiber (such as, for example, SMF-28® fiber) back scattered Rayleigh power is very small due to low Rayleigh scattering coefficients (high quality of fiber core materials) and small capture efficiency due to small NA of the fiber. Typical single mode transmission fiber has a numerical aperture (NA) of about 0.11 to 0.12 (e.g., it is 0.12 for SMF-28® fiber). The hybrid core fibers 50 described herein have numerical apertures greater than 0.15, for example about 0.2 to 0.4 (e.g., 0.2 to 0.3). The larger numerical aperture of the hybrid core 30 leads to higher detected power $P_s$, relative to that provided by a reference, single mode fiber. (As referred to herein, the reference, single mode core fiber possesses the same single mode core diameter and core composition as the single mode core portion 31 of the optical fiber 50, and also the same fiber cladding diameter, cladding composition, and length as the optical fiber 50.) Similarly, the larger numerical aperture of the hybrid core 30 leads to higher detected power $P_s$, relative to that provided by the SMF-28® fiber.

Without being bound by theory, the backscattered signals transmitted in the hybrid core 30 of the optical fiber 50 to the receiver 110a in the fiber sensor 100 are higher in amplitude and have more power $P_s$ than that transmitted in a sensor system that utilizes a reference, single mode, due to: (i) high doping level in the inner core portion 31, and (ii) more efficiently capture of backscattered light propagating through both the single mode portion 31 (inner core portion) and the multimode outer core portion 32. (In at least some embodiments described herein, the reference, single mode fiber is SMF-28® fiber, available from Corning Incorporated of Corning New York). Therefore, the sensor system employing the optical fiber 50 with hybrid core configuration of can result in less signal loss, higher signal-to-noise ratios and/or better spatial resolution relative to that of the typical sensor system that uses a single mode transmission fiber (e.g., SMF-28® fiber) as a sensing fiber.

Thus, we discovered that one can increase capture efficiency of back scattered light using high numerical aperture (e.g., NA>0.15, or $0.15 \leq NA \leq 0.4$, or $0.2 \leq NA \leq 0.4$) large diameter multi-mode core portion 32 situated adjacent to the single mode core portion 31 (see, for example, FIGS. 1B, 1C-1G, or FIG. 3).

Accordingly, in one embodiment, a single mode core portion 31 is surrounded by a multi-mode core portion 32 and the light from the light source is launched primarily (e.g. >80% of optical power, and preferably >90% of optical power, or even >95% of light's optical power is launched) into the single mode core portion 31 of the core 30. The backscattered light is collected by both the single mode core 31 and multimode core 32 and is provided to the photodetector (receiver 110a). Thus, the back scattered light will be guided to sensing system's photo detector by the entire core 30, including the multi mode core portion 32. The power of the optical signal associated with the back scattered light provided to the detector by the hybrid core optical fiber 50 will be much larger than that provided by a typical single mode transmission fiber. Thus, the use of the hybrid core optical fiber 50 will improve signal-to-noise ratio of the sensing system 100 relative to a comparative system that utilizes a reference, single mode fiber and also relative and/or relative to a comparative system that utilizes SMF-28® fiber.

Figure 1F:
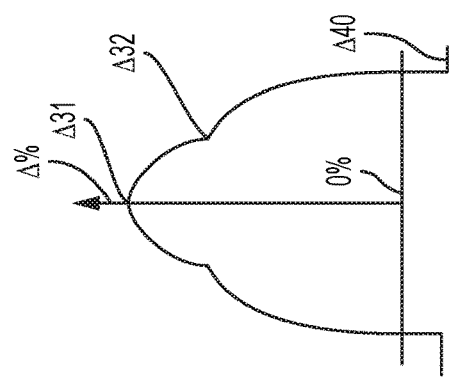
Figure 1E:
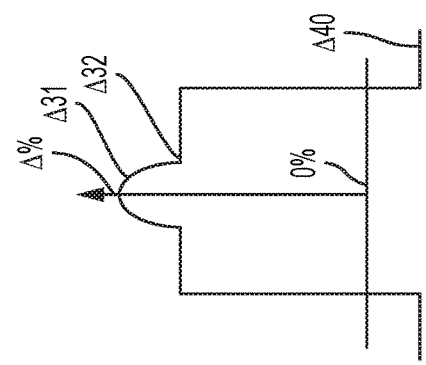
Figure 1D:
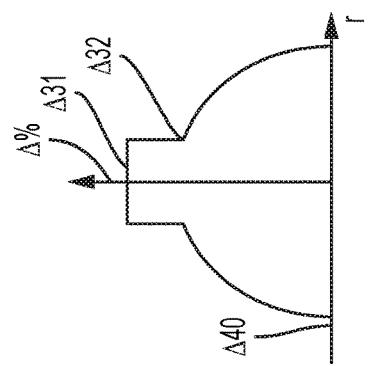

FIG. 1C shows relative refractive index profile of hybrid core optical fiber 50. This fiber utilizes single mode core portion 31 with a step index profile which is surrounded by a step index multi-mode core portion 32. As shown in FIGS. 1D-1F other designs for the hybrid core 30 are also possible. It is noted that in the optical fiber 50 either a step index or a graded index single mode core portion 31 may be surrounded by a either a graded index or a step index multi-mode core portion 32.

In another exemplary embodiment the fiber sensor 100 utilizes the hybrid core optical fiber 50 in distributed fiber sensors 100 by operating with only a fundamental mode of the hybrid core. That is, the light pulses are launched into the fiber in only the fundaments (LP01) and back scattered light (signal) is collected and provided to a receiver in the fundamental mode as well. (This can be done, for example, by splicing a small section of single mode fiber to the transmission end 10a of the hybrid core fiber 50, which will strip the higher order modes from reaching the receiver.) Thus, in this embodiment, this small section of the single mode fiber can be coupled to the optical fiber 50 and can be can be utilized to launch signal light in the fundamental mode into the fiber 50 and also to receive the back scattered light in the fundamental mode from the optical fiber 50. Fiber 50 of these embodiments may have refractive index profiles similar to that of fibers depicted in FIGS. 1C-1F. However, in other embodiments higher order modes can also be detected, and the backscattered signal from such high order modes may also be utilized, if desired.

Because the single mode core portion 31 has a larger relative refractive index than that of a reference, single mode fiber), the core 30 of the optical fiber 50 will produce more Rayleigh back scattered signal to improve sensing performance of the optical fiber 50. High level of Ge in the core portion 31 (e.g., greater than 6 wt %, greater than 8 wt %, e.g., 10 to 50 wt %, or 60 wt %) also increases back scatter. Finally, doping the core 30 (either one, or both core portions) with F (e.g., 2-5 Wt %) also increases back scatter, and improves the back scattered light capture efficiency of the fiber), thus improving sensing performance of the fiber sensor fiber 50.

Figure 3:
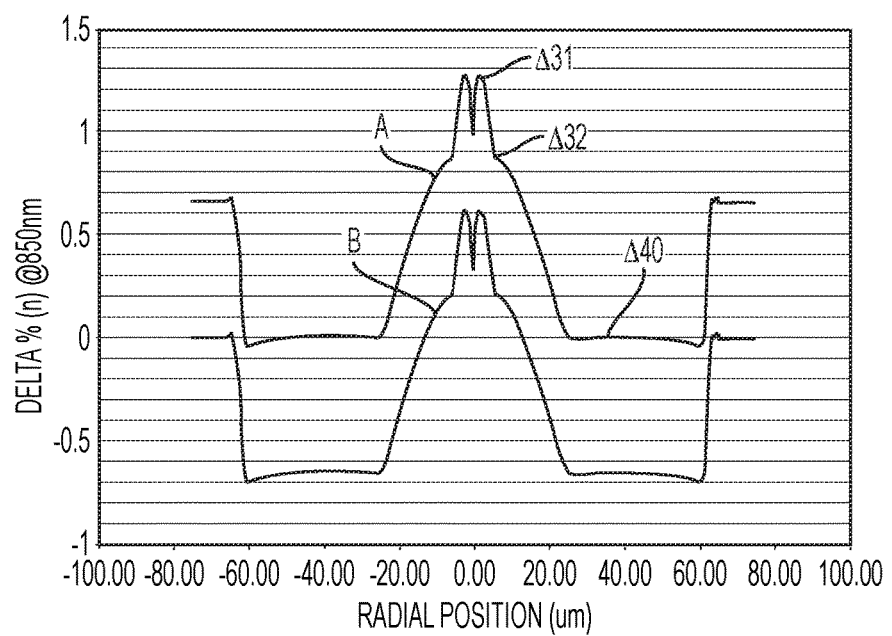
FIG. 3 depicts a relative refractive index of one manufactured embodiment of the fiber (profile A) depicted in FIGS. 1A and 1B.

According to one exemplary embodiment a manufactured hybrid core fiber 50 with a relative refractive index profile is illustrated in FIG. 3 (profile A), where $\Delta_{31}$, $\Delta_{32}$ and $\Delta_{31}$ were measured at 850 nm. This optical fiber 50 comprises a core 30 with a single mode core portion 31 having a maximum relative refractive index $\Delta_{31}$ of about 1.28%. This fiber also comprises a multi-mode core portion 32 having a maximum relative refractive index $\Delta_{32}$ of about 0.88%.

The MFD (mode field diameter) of FIG. 3 (profile A) fiber, at a wavelength of 1550 nm is 9.7 μm. A typical single mode fiber, for example SMF-28® fiber available from Corning incorporated, has a MFD of about 10 μm at the 1550 nm wavelength. Thus, the MFD of the FIG. 3 (profile A) fiber 50 is essentially the same as that of a typical single mode fiber such as SMF-28® fiber. The core size (outer diameter of the core) of the SMF-28® fiber is also about the same as that of the core portion 31 of the hybrid core fiber 50 corresponding to FIG. 3 (profile A). The optical fiber 50 corresponding to profile A of FIG. 3 fiber has an inner core portion (single mode core portion 31) that is silica dopped with about 23 wt % $GeO_2$, and an outer core portion (multi mode core portion 32) that is doped with about 16 wt %. $GeO_2$. In this embodiment (profile A) the cladding 40 is pure silica and contains no fluorine and no boron. Thus, it has a maximum relative refractive index $\Delta_{40}$ of 0. In this embodiment $\Delta_{31}$-$\Delta_{40}$ is about 1.3%, and $\Delta_{32}$-$\Delta_{40}$ is about 0.8%. It is noted that in SMF-28® fiber the difference in refractive index between the maximum relative refractive index of the core and that of the cladding of 0.34 (the cladding of SMF-28® fiber is a pure silica cladding).

In other embodiment cladding 40 may include fluorine and/or boron doped silica (profile B in FIG. 3). More specifically, the profile B fiber is similar to the profile A fiber, but the whole fiber profile is shifted downward relative to profile A fiber, due to the presence of fluorine in the core and the cladding.

Figure 4:
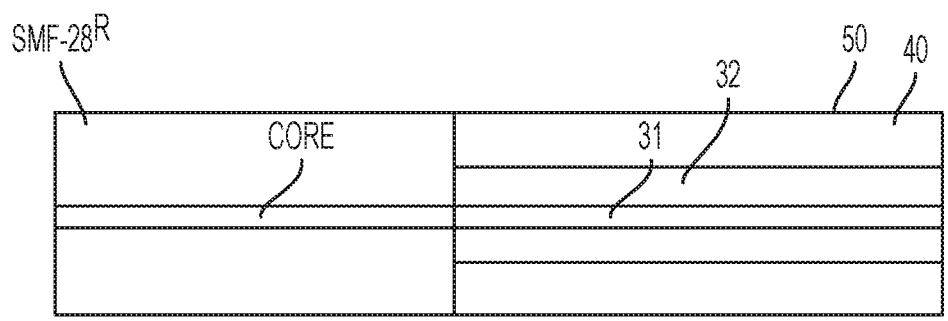
FIG. 4 illustrates schematically a hybrid core fiber 50 with the refractive index profile shown in FIG. 3 which is spliced to SMF-28® fiber.
Figure 5:
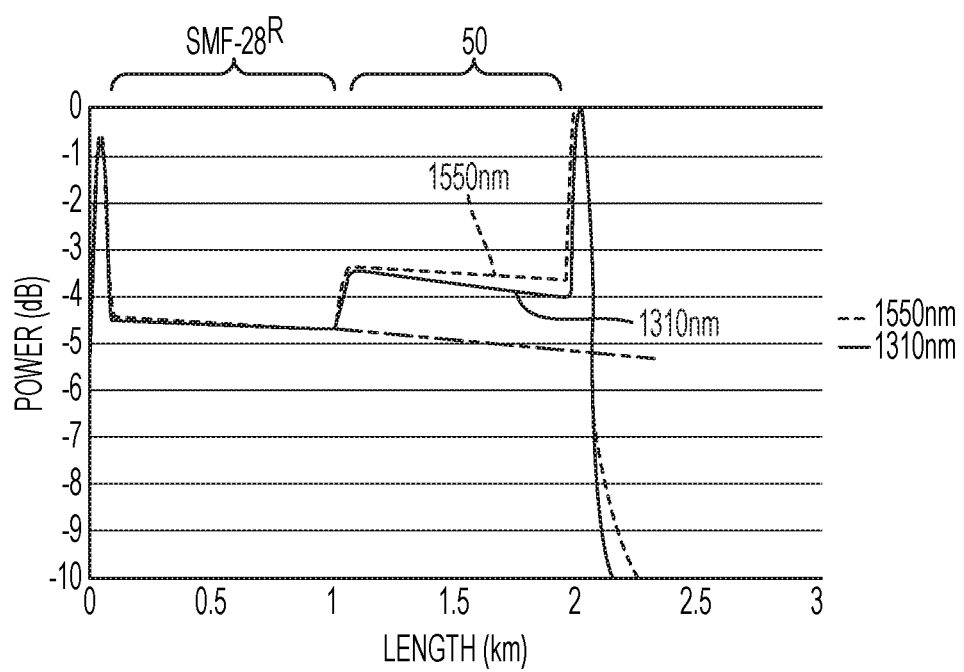
FIG. 5 illustrates OTDR traces for SMF-28® fiber (~1 km) that was placed with the hybrid core fiber 50 (~1 km) of FIG. 3, as shown in FIG. 4. Light was launched into SMF-28 fiber (left parts of the OTDR traces).

According to one embodiment, approximately 1 km of the hybrid core fiber 50 with the refractive index profile shown in FIG. 3 (profile A fiber) was spliced with about 1 km of SMF-28® (reference fiber), as shown in FIG. 4. As shown in this figure, the two fibers are aligned such that the core portion of the SMF-28® fiber is spliced to the single mode core portion 31 of the fiber 50. To ensure proper alignment between the two fibers, fiber to fiber alignment before splice was done using light source with wavelength of 1550 nm (light was launched into SMF-28®, fiber) and beam profiler (available commercially) at the output of optical fiber 50, to monitor the beam shape so as to ensure that only the fundamental mode was launched into the single mode core portion 31. In this embodiment, alignment was done to excite primarily fundamental mode in hybrid core fiber 50, without launching into the fiber 50 light in higher order modes. After the splicing was complete, standard OTDR unit was used to monitor the backscattered light through this system of two fibers. FIG. 5 is an OTDR trace illustrating the power of back scattered light (dB) as it propagates trough the two spliced fibers. More specifically, the SMF-28® fiber (comparative fiber) was connected with optical time domain reflectometer (OTDR) and OTDR traces (the amount of backscattered light, measured as power (dB)) at 1310 nm and 1550 nm wavelengths were measured (FIG. 5). As one can see, the back scattered signal from the hybrid core fiber 50 is substantially larger than that from a typical single mode fiber, for example such as SMF 28® fiber. The difference in measured backscattered light between the single mode core of the SMF 28® fiber and the single mode portion 31 of the core for the FIG. 3 (profile A) fiber is about 1.3 dB. However, in this experiment we did not measure the amount of light propagating through the multimode portion 32 of the fiber 50. This additional light, collected by the multimode core portion 32 of the fiber 50 was calculated to provide an additional 4 dB improvement in to total collected signal. In this exemplary embodiment, the total improvement when using the optical fiber 50 instead of SMF-28® fiber (reference fiber) is calculated to be about 5.3 dB, which translates to a signal-to-noise ratio that is at about 3.5 times (or about 350%) greater than a signal-to-noise ratio from a backscattered signal from a reference, single-mode core optical fiber such as, for example, SMF 28® fiber. The NA of this optical fiber 50 is about 0.2.

In some hybrid core fiber 50 embodiments the NA is 0.3, and in some embodiments 0.4. The total improvement a signal-to-noise ratio of these fibers is at about 6 times (when NA is 0.3) or 11 times (when NA is 0.4) greater than a signal-to-noise ratio from a backscattered signal from a reference, single mode core optical fiber such as, for example, SMF 28® fiber.

With regard to the fiber sensor 100 of the disclosure, the hybrid core nature of the optical fiber 50 is advantageous in collection of more backscattered light than from a typical single mode core fiber. For example, the incident light may be lounged into a single mode core portion 31 at the transmission end 10a of the fiber 50, and will propagate through the single mode core portion 31 toward the other end of the fiber, just like it would propagate through the single mode fiber. However, because the optical fiber 50 also includes a multi-mode core portion 32, the back scattered light will be collected into much bigger core (the entire core 30) and thus more light will be captured and provided to a receiver, allowing for better more signal collection. This results in improvement of signal-to-noise ratio of the fiber sensor 100 (more sensitivity).

A detector or receiver 110a receiving the backscattered signal from the entire core 30 (from the single mode core portion 31 as well as from the multimode core portion 32) rather than just from the single mode portion of the core will receive backscattered light signal of higher amplitude (more power). Consequently, the nature of the optical fiber 50 results in a better signal-to-noise ratio (S/N) for the total backscattered signal emanating from the core 30, than that received from a typical single mode fiber, leading to a higher spatial resolution in the fiber sensor 100 for distributed sensing applications. Further, one skilled in the field of the disclosure can configure an optical fiber 50 with a particular size and relative refractive index of the core portions 31 and 32 to accommodate a spot size from the light source 110 selected for use with the fiber sensor 100. For example, in some embodiments, the incident light from a single light source may have a spot size of about 5 microns, 10 microns, 15 microns, 20 microns, and all spot sizes between these specified spot sizes, while the optical fiber 50 may have a core portion 31 with matching (or substantially the same) diameter. Also, for example, in some embodiments, the incident light from a single light source may have a spot size of 20 microns, 30 microns, 40 microns, 50 microns, 60 microns, 70 microns, 80 microns, 90 microns, 100 microns in diameter, and all spot sizes between these specified spot sizes, while the optical fiber 50 may have a core portion 32 with matching (or substantially the same) diameter.

Thus, according to an implementation of the fiber sensor 100, the optical fiber 50 can be configured such that the total backscattered signal emanating from the core 30 at the transmission end 10a of the fiber 50 has a signal-to-noise ratio that is greater than a signal-to-noise ratio from a backscattered signal obtained from a reference, single mode core fiber. Further, the total backscattered signal emanating from the hybrid core 30 of the optical fiber 50 can exceed the signal-to-noise ratio associated with the backscattered signal obtained from the reference, single mode fiber by a factor of at least about 1.5. In certain aspects, the total backscattered signal emanating from the core 30 of the fiber 50 can exceed the signal-to-noise ratio associated with the backscattered signal obtained from the reference, single mode fiber by a factor of about 1.5, 2, 2.5, 3, 3.5, 4, 5, 5.5, 6, 6.5, 7, 7.5, 8, 8.5, 9, 9.5, 10, 11, or all values between these specified factors.

According to some embodiments of the fiber sensor 100, the optical fiber 50 can be configured such that the total backscattered signal emanating from the core 30 at the transmission end 10a of the fiber 50 has a signal-to-noise ratio that is greater than a signal-to-noise ratio from a backscattered signal obtained from a SMF-28® fiber. Further, the total backscattered signal emanating from the hybrid core 30 of the optical fiber 50 can exceed the signal-to-noise ratio associated with the backscattered signal obtained from SMF-28® fiber by a factor of at least about 1.5. In certain aspects, the total backscattered signal emanating from the core 30 of the fiber 50 can exceed the signal-to-noise ratio associated with the backscattered signal obtained from the SMF-28® fiber by a factor of about 1.5, 2, 2.5, 3, 3.5, 4, 5, 5.5, 6, 6.5, 7, 7.5, 8, 8.5, 9, 9.5, 10, 11, or all values between these specified factors.

Figure 6:
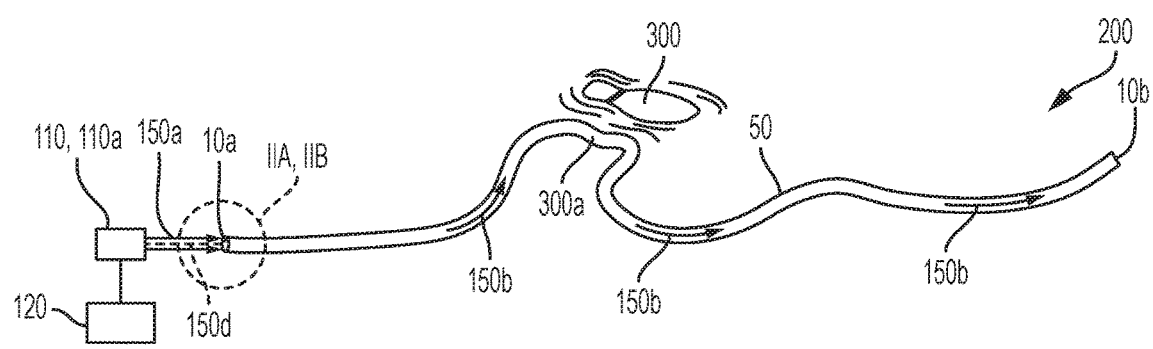
FIG. 6 illustrates a perspective schematic view of a fiber sensor system employing a hybrid core optical fiber according to an aspect of the disclosure.
Figure 7A:
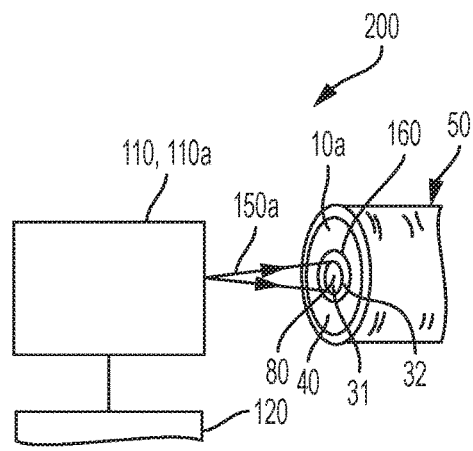
FIG. 7A is an enlarged, end-on schematic view of incident light directed from a light source into the cores in the optical fiber of the fiber sensor system depicted in FIG. 6.
Figure 7B:
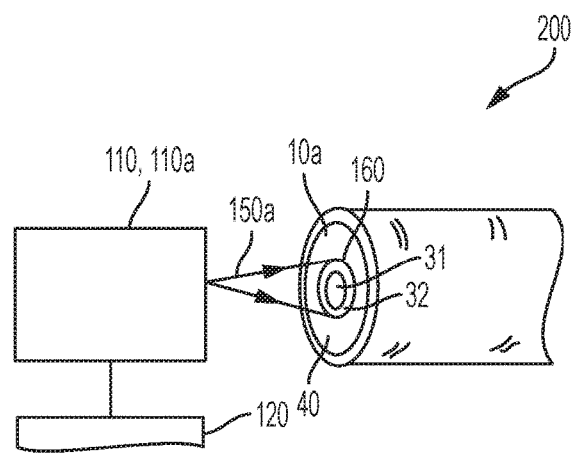
FIG. 7B is an enlarged, end-on schematic view of incident light directed from a light source into the cores in the optical fiber of the fiber sensor system depicted in FIG. 6.

Referring to FIGS. 6, 7A, 7B and 7C, a fiber sensor system 200 employing an optical fiber 50 is depicted according to another aspect of the disclosure. The sensor system 200 includes an optical fiber 50 configured for operation at a wavelength from about 300 nm to about 2000 nm (e.g., 1200 nm to 2000 nm). Further, the optical fiber 50 is defined by a transmission end 10a, another (second) end 10b and length 52. In addition, the optical fiber 50 employed in the sensor system 200 includes a hybrid core 30, along with a cladding 40 surrounding the core 30. The core 30 comprises a single mode core portion 31 surrounded by a multimode core portion 32. Unless otherwise noted, the hybrid core optical fiber 50, along with its associated elements (e.g., cladding 40), depicted in FIGS. 6, 7A and 7B is configured with the same or similar features and functions as the fiber 50 depicted in FIGS. 1A-1G, or 3.

Figure 7C:
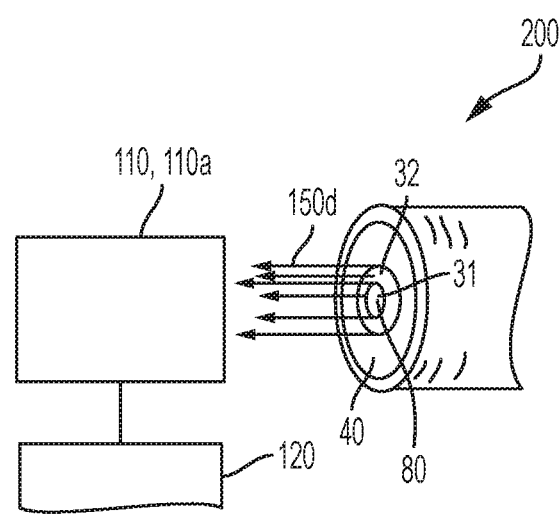
FIG. 7C is an enlarged, end-on schematic view of a backscattered light signal emanating from the cores in the optical fiber of the fiber sensor system depicted in FIG. 6.

The fiber sensor system 200 depicted in FIGS. 6, 7A and 7C also includes a light source 110 configured to direct a single spot 160 of incident light 150a into the hybrid core 30 at the transmission end 10a of the fiber 50. As shown in FIG. 7A, according to one embodiment the light source 110 produces an optical signal 150a (light beam) having a spot size 160 that preferably overlaps only with the single mode portion 31 of the core 30 at the transmission end 10a of the fiber 50. In this embodiment the spot 160 overlaps with only single mode portion 31 of the core 30 within the fiber 50 to ensure that the optical signal injected into the core stays in the single mode as it is transmitted down the length of the fiber 50. Light sources 110 suitable for use in the fiber sensor system, 200 include but are not limited to: a tunable laser, LED light source, semiconductor laser diode, and a VCSEL source.

The fiber sensor system 200 depicted in FIGS. 6, 7B and 7C also includes a light source 110 configured to direct a single spot 160 of incident light 150a into the hybrid core 30 at the transmission end 10a of the fiber 50. As shown in FIG. 7B, according to one embodiment, the light source 110 produces an optical signal 150a in the Gaussian mode with a spot size 160 that preferably overlaps with the entire core 30 of the fiber 50 at the transmission end 10a. In this embodiment, the spot 160 overlaps both the single mode portion of the core and the multi-mode portion of the core 31, 32, and light stays multimode as it propagates through both portions of the core towards the fiber end 10b in this mode. Light sources 110 suitable for use in the fiber sensor system 200 include but are not limited to: a tunable laser, LED light source, semiconductor laser diode and a VCSEL source.

Again referring to FIGS. 6, 7A, 7B and 7C, the fiber sensor system 200 further includes a receiver 110a configured to receive a total backscattered signal 150d that emanates from the core portions 31 and 32 after the incident light 150a from the single spot 160 has been injected into the core 30 at the transmission end 10a of the fiber 50. As specifically depicted in FIGS. 6, 7A, 7B and 7C, the light source 110 and receiver 110a are contained in a single unit and the signals 150a and 150d are decoupled through means understood by those skilled in the field of this disclosure. Those skilled in the field can also appreciate that the light source 110 and receiver 110a can be configured as separate units within the sensor system 200, each handling the respective optical signal 150a and total backscattered signal 150d. The receiver 110a for use in the fiber sensor system 200 may include a photodetector, e.g., a diode assembly, single photo diode, or any other receiver suitable to perform the intended function of the receiver 110a in the system 200 as understood by those skilled in the field of the disclosure.

Still referring to FIGS. 6, 7A, 7B and 7C, the fiber sensor system 200 also includes a signal interrogation element 120 that is coupled to the light source 110 and the receiver 110a. The signal interrogation element 120 is configured to process the backscattered signal 150d to obtain a sensor measurement that corresponds to a feature in proximity to or contacting the fiber 50. Suitable signal interrogation elements 120 for use in the fiber sensor system 200 include but are not limited to devices, elements and assemblies understood in the field of the disclosure that can detect or otherwise process signal amplitude, signal phase and/or signal frequency associated with the backscattered signal 150d.

As also depicted in FIGS. 6, 7A 7B and 7C, the fiber sensor system 200 can be configured according to an aspect of the disclosure to obtain a sensor measurement (e.g., a pressure reading) that corresponds to a feature, e.g., footstep 300, in proximity to the optical fiber 50. More particularly, the light source 110 and the optical fiber 50 within the system 200 are configured such that incident light 150a produces a spot 160 that is injected into the core 30 at the transmission end 10a of the fiber 50 (see FIG. 1A). The incident light 150a propagates through the core 30 (either through the single mode portion of the core, or through the entire core, as described above) of the fiber 50 toward the second end 10b. The incident light 150a scatters throughout the length of the fiber according to Rayleigh scattering mechanisms (e.g., from microscale and/or nanoscale defects in the fiber) and a portion of the incident light is scattered back toward the transmission end 10a of the fiber and the back scattered light propagates through both core portions 31 and 32 towards the transmission end 10a of the fiber. Because the collecting efficiency of both core portions 31, 32 is greater than that of just core portion 31 more back scattered light propagates toward the transmission end 10a of the fiber, creating a stronger backscattered signal 150d.

Referring again to FIGS. 6, 7A, 7B and 7C, as the incident light 150a propagates through the core 30 of the fiber 50, the intensity of the backscattered signal 150d can be changed based on local displacement, temperature changes, and/or deformation of the fiber associated with a feature (e.g., a footstep 300) in proximity or in contact with the fiber at a particular location z, such as location 300a shown in FIG. 6. Consequently, the total backscattered signal 150d can possess an intensity change relative to reference light intensity. As such, the backscattered signal 150d emanating from both portions 31, 32 of the core 30 can be summed into a total backscattered signal by the receiver 110a and/or the signal interrogation element 120 to calculate the particular parameter associated with the feature 300, e.g., pressure, that can be correlated to the wavelength shift between the incident light 150a and the backscattered signal 150d.

The fiber sensor system 200 can also be configured to make use of the total backscattered signal 150d to estimate time and location-related information associated with the feature 300 in proximity to or in contact with the fiber 50. In particular, the light source 110, receiver 110a and signal interrogation element 120 can be configured within the fiber sensor system 200 to measure the fraction of light that is reflected back through the fiber 50 via Rayleigh scattering mechanisms using optical time-domain reflectometry (OTDR). In particular, the system 200 can compare the amount of light in the total backscattered signal 150d compared to the incident light 150a at different times to ascertain the location 300a associated with the feature 300 in proximity to or in contact with the fiber 50.

Each of the distributed fiber sensors and sensor systems described herein, including fiber sensor 100 and fiber sensor system 200, demonstrate one or more of the following advantages over conventional distributed fiber sensors and sensor systems that employ typical single mode core optical fibers (e.g., commercial grade telecommunication grade optical fibers such as, for example, SMF 28® fiber) as the sensing fibers. One advantage of the fiber sensors and sensor systems of the disclosure is that the backscattered signal from the hybrid core fibers 50 will be greater than the backscattered signal from a conventional, single mode core fiber at least 0.5 dB (for example by 1 dB to 10 dB (for 0.4 NA hybrid core fiber). Consequently, the signal-to-noise ratio (S/N) of the backscattered signal associated with the fiber sensors and sensor systems of the disclosure can be significantly improved over the signal-to-noise ratio of conventional fiber sensors and systems. Another advantage is that lower power signals that are less susceptible to non-linear scattering effects can be launched into the hybrid core 30 of the optical fiber 50 in order to achieve roughly the same backscattered signal strength $P_s$ as that of the single mode core fiber, when a much higher power signal $P_0$ (from a stronger light source) is transmitted into the conventional single mode core fiber.

Further, it will be apparent to those skilled in the art that various modifications and variations can be made without departing from the spirit or scope of the claims.

What is claimed is:

1. A Rayleigh scattering fiber sensor, comprising:
   an optical fiber configured for operation at a wavelength from about 300 nm to about 2000 nm, and further defined by a transmission end, another end, a fiber outer diameter, and a fiber length, the fiber comprising:
   a hybrid core comprising a single mode core portion and a multi-mode core portion; and
   a cladding surrounding the hybrid core;
   wherein, the single mode core portion comprises sufficient weight percentage of $GeO_2$ to raise a maximum relative refractive index of the single mode core portion relative to pure silica glass to between 0.4% and 3%;
   wherein, the multi-mode core portion comprises sufficient weight percentage of $GeO_2$ to raise a maximum relative refractive index of the multi-mode core portion relative to pure silica glass to between 0.1% and 2.7%;
   wherein, the maximum relative refractive index of the single mode core portion is greater than the maximum relative refractive index of the multi-mode core portion; and
   wherein, the fiber length is from about 10 m to 100 km.
2. The fiber sensor according to claim 1, wherein the multi-mode core portion comprises 5.5 wt % to 45 wt % $GeO_2$.
3. The fiber sensor according to claim 1, wherein the single mode core portion has a maximum relative refractive index $\Delta_{31}$ and the multi-mode difference core portion has a maximum relative refractive index $\Delta_{32}$ and $0.2\% \leq \Delta_{31}-\Delta_{32} \leq 1\%$.
4. The sensor according to claim 1, wherein the core at the transmission end of the fiber are arranged and configured within the fiber to receive incident light from a single light source having a spot size from about 1 micron to about 100 microns.
5. The fiber sensor of claim 1 further comprising:
   a low index layer separating the single mode core portion and the multi-mode core portion, the low index layer having a maximum index of refraction that is lower than a maximum index of refraction of the single mode core portion and a maximum index of refraction of the multi-mode core portion;
   wherein, each of the single mode core portion, the multi-mode core portion, and the low index layer comprises $GeO_2$.
6. The fiber sensor of claim 5,
   wherein, each of the single mode core portion, the multi-mode core portion, and the low index layer comprises at least 15 wt % $GeO_2$.
7. The fiber sensor of claim 1,
   wherein, the difference between the maximum relative refractive index of the single mode core portion and the maximum relative refractive index of the multi-mode core portion, relative to pure silica glass is from 0.3% to 0.6%.
8. The fiber sensor of claim 1,
   wherein, the single mode core portion comprises greater than 6 wt % $GeO_2$.
9. The fiber sensor of claim 1,
   wherein, the single mode core portion comprises about 23 wt % $GeO_2$; and
   wherein, the multi-mode core portion comprises about 16 wt % $GeO_2$.
10. A fiber sensor, according to claim 1 wherein the optical fiber is configured for operation at a wavelength from about 600 nm to 1600 nm.
11. A fiber sensor, according to claim 1 wherein the optical fiber is configured for operation at a wavelength from about 1200 nm to 1600 nm.
12. The fiber sensor of claim 1 wherein the optical fiber is configured for operation at a wavelength from about 1200 nm to 1600 nm, the fiber sensor further comprising a light source providing light at the wavelength of 1200 nm to 1600 nm, and a receiver configured to receive a total backscattered signal situated in 1200 nm to 1600 nm wavelength range.
13. A Rayleigh scattering fiber sensor, comprising:
    an optical fiber configured for operation at a wavelength from about 300 nm to about 2000 nm, and further defined by a transmission end, another end, a fiber outer diameter and a fiber length, the fiber comprising:
    a hybrid core comprising a single mode core portion and a multi-mode core portion; and
    a cladding surrounding the hybrid core, and
    further wherein the transmission end of the fiber exhibits a total backscattered signal that emanates from both the single mode core portion and the multimode core portion after light from a source has been injected into the core at the transmission end of the fiber;
    wherein, the single mode core portion comprises $GeO_2$;
    wherein, the multi-mode core portion comprises $GeO_2$;
    wherein, the maximum relative refractive index of the single mode core portion is greater than the maximum relative refractive index of the multi-mode core portion; and
    wherein, the fiber length is from about 10 m to 100 km.
14. The sensor according to claim 13, wherein the total backscattered signal has a signal-to-noise ratio that is greater than a signal-to-noise ratio from a backscattered signal from a reference, standard single-mode core optical fiber.
15. The sensor according to claim 13, wherein the total backscattered signal has a signal-to-noise ratio that is at least two times greater than a signal-to-noise ratio from a backscattered signal from a reference, single mode core optical fiber.

16. The sensor according to claim 15, wherein the reference, single mode core optical fiber has a numeral aperture between 0.11 and 0.12; and wherein, the optical fiber has numerical aperture greater than 0.15.

17. A Rayleigh scattering fiber sensor system, comprising:
an optical fiber configured for one of single or few mode operation at a wavelength from about 300 nm to about 2000 nm, and further defined by a transmission end, another end, a fiber outer diameter and a fiber length, the fiber comprising:
a hybrid core comprising a multi-mode core portion and a single mode core portion, and
a cladding surrounding the hybrid core,
a light source configured to direct a spot of incident light into at least one portions of the core at the transmission end of the fiber;
a receiver configured to receive a total backscattered signal that emanates from the hybrid core after the spot of incident light has been injected into the hybrid core at the transmission end of the fiber; and
a signal interrogation element configured to process the backscattered signal to obtain a sensor measurement that corresponds to a feature in proximity to or in contact with the fiber;
wherein, the single mode core portion comprises sufficient weight percentage of $GeO_2$ to raise a maximum relative refractive index of the single mode core portion relative to pure silica glass to between 0.4% and 3%;
wherein, the multi-mode core portion comprises sufficient weight percentage of $GeO_2$ to raise a maximum relative refractive index of the multi-mode core portion relative to pure silica glass to between 0.1% and 2.7%;
wherein, the maximum relative refractive index of the single mode core portion is greater than the maximum relative refractive index of the multi-mode core portion; and
wherein, the fiber length is from about 10 m to 100 km.

18. The system according to claim 17, wherein the sensor measurement comprises one or more characteristic from the group consisting of temperature, pressure, strain, displacement, and noise.

19. An optical fiber for use in a Rayleigh scattering sensor comprising:
(i) a hybrid core comprising a single mode core portion and a multi-mode core portion; and
(ii) a cladding surrounding the hybrid core, wherein the multi-mode core portion comprises 5.5 wt % to 45 wt % $GeO_2$;
wherein, the fiber length is from about 10 m to 100 km.

20. The optical fiber of claim 19, wherein the single mode core portion comprises $GeO_2$.

21. The optical fiber of claim 19, wherein the difference between maximum relative refractive index of the single mode core portion and the maximum relative refractive index of the multi-mode difference core portion is from 0.2% to 1%.

* * * * *

UNITED STATES PATENT AND TRADEMARK OFFICE
CERTIFICATE OF CORRECTION

PATENT NO. : 10,317,255 B2
APPLICATION NO. : 15/873459
DATED : June 11, 2019
INVENTOR(S) : Anthony Artuso et al.

Page 1 of 1

It is certified that error appears in the above-identified patent and that said Letters Patent is hereby corrected as shown below:

In the Claims

In Column 17, Line 2, Claim 16, delete "numeral aperture" and insert -- numerical aperture --, therefor.

Signed and Sealed this
Eighteenth Day of February, 2020

Andrei Iancu
*Director of the United States Patent and Trademark Office*